Patented Nov. 25, 1952

2,619,434

UNITED STATES PATENT OFFICE 2,619,434

METAL OXIDE SCALE REMOVAL

Philip Berkeley Kraus, Chadds Ford, Pa., and Holger Heinrich Schaumann, Newark, Del., assignors to E. I. du Pont de Nemours & Company, Wilmington, Del., a corporation of Delaware No Drawing. Application April 1, 1946,
Serial No. 658,868

7 Claims. (Cl. 134—2)

This invention relates to the removal of metal oxide scale, and more particularly to the removal of oxide scale deposit formed in a reaction zone employed in the vapor phase oxidation or hydrolysis of volatile metallic halides to obtain improved forms of metal oxides.

The vapor phase oxidation of volatile metallic halides to form useful metallic oxides in a finely-divided state is well known. Thus, the chlorides of titanium, iron, aluminum and the like may be reacted with oxygen to form the corresponding oxides and chlorine by mixing the vapors in or passing the mixed vapors through a reaction chamber maintained at an elevated temperature ranging from about 700° C. to 1200° C. Similar results may be obtained by reacting metallic chloride vapors with steam at elevated temperature to form metallic oxides and hydrogen chloride gas.

In reactions of this type, it is frequently found that disadvantageously a portion of the solid reaction product collects and accumulates in the reaction zone and is not carried out in the product gas stream. While this accumulation of oxide may consist merely of loose particles, easily removed by a high velocity gas stream or by mechanical action, more often it is in the form of a tightly adherent, sintered, agglomerated or scaly mass which is firmly attached to and objectionably coats either the walls of the reaction vessel or the vapor inlets. When in this form, the adhering scaly deposit can be removed only by drastic abrasive (scraping) or chemical action.

Obviously, this scale formation in the reaction chamber and associated equipment is extremely detrimental to the progress of the involved chemical reaction and necessitates frequent interruptions and shut-downs in the operation for clean-out. One adverse effect therefrom resides in the reduction or complete loss in heat transfer through the walls of the reactor. Careful control over the temperature in the reactor is necessary to provide a product of desirable physical form and properties as well as to promote a high degree of reaction. In some instances, heat evolved by the reaction must be absorbed through the walls of the reaction chamber in order to maintain the proper balance of temperature within the reactor. In other instances, heat is supplied externally through the reactor walls. In either case, lowering of heat transfer through the walls due to scale formation will change the temperature inside the reactor to an undesired extent and consequently interfere with the completeness of the reaction or with the formation of the desired type of metallic oxide.

In addition, scale build-up reduces the cross-sectional area of the reactor and results in producing a higher lineal velocity of the reacting gases and reduces the time of contact between the reactants at the reaction temperature. This effect will often be sufficient to reduce considerably the extent of reaction and will also have an adverse effect on the average particle size of the metallic oxide product. If such scale build-up is allowed to continue long enough, stoppage of the process altogether will, as noted, result. This occurs when the scale grows to the point where it completely plugs the reactor and prevents issuance therefrom of the reaction products or when a plugging of the vapor inlets takes place to prevent the reactants from reaching the reaction chamber.

Many prior proposals exist for limiting the formation of scale in processes of the type herein contemplated, including dilution of the reactants with inert gases; use of inert gases as blankets for the walls of the reactor vapor inlets; use of relatively large reaction zones to minimize contact of the reactants with the reactor walls; coating the interior of the reaction chamber with carbon or other oxidizable material; or the maintenance of reactor wall temperatures below the involved reaction. While some degree of reduction of oxide deposition is attained by these methods, all prove disadvantageous since the reaction taking place is detrimentally affected when they are resorted to and impairment of the physical form of the oxide product results. Consequently, it is generally preferred to operate under conditions such as will insure production in good yields of a product having the desired and essential physical properties, even though objectionable oxide scale formation takes place.

It is among the objects of this invention to overcome the above and other disadvantages of prior vapor phase metallic oxide-producing processes, and to provide novel methods and means for attaining these objects. Particular objects of the invention include: the provision of an effective method for removing, either continuously or periodically, scaly oxide deposits formed in a reaction zone, and especialy on the internal walls thereof and outlets leading therefrom during vapor phase oxidation or hydrolysis of volatile metallic halides; to so control such scale formation that it not only will not interfere with but will promote the oxidation or hydrolysis reaction; and to recover the resulting metallic oxide product in a highly-useful physical form. Other objects and advantages will be apparent from the ensuing description of the invention.

The foregoing and other objects are attainable in this invention which broadly comprises removing metal oxide scale adhering to a reaction zone and formed therein as a result of the vapor phase reaction of a metal halide with an oxygen-containing gas by subjecting said scale to the action of a gaseous substance adapted to react therewith and effect its removal in a gaseous state.

In a more specific and preferred embodiment, the invention comprises removing adhering titanium oxide scale from the internal walls of a reaction zone, formed thereon during reaction, at temperatures ranging from 900° C.–1200° C., of vaporized titanium tetrachloride with an oxidizing gas, by introducing into said zone gaseous carbon monoxide and chlorine in amount sufficient to react with all of said $TiO_2$ scale and effect its removal in the form of gaseous titanium tetrachloride and carbon dioxide.

In practically applying the invention in accordance with one preferred embodiment, involving the production of pigment titanium oxide by vapor phase oxidation of titanium tetrachloride with an oxidizing gas, such as air, in a reaction chamber maintained at a temperature ranging preferably from about 900° C.–1200° C., the oxidation or hydrolysis reaction is continued until the reduction in flow rates or increase in the amount of reactants in the exhaust gases indicates that appreciable and objectionable formation of adhering $TiO_2$ scale has occurred and has built up on the chamber walls to such an extent that it must be removed to avoid apparatus plugging. At such time, introduction of the vaporized titanium tetrachloride and oxidizing gas reactants is discontinued and a suitable gas or mixture of gases adapted to convert the adhering titanium oxide to a volatile halide is introduced into said reaction vessel. Preferably a gaseous mixture comprising equal parts by volume of carbon monoxide and chlorine is utilized for reaction with the deposited $TiO_2$. During introduction and passage of such gas mixture into and through the reactor, the temperature in the reaction chamber is maintained at a relatively high level and preferably about the same as that employed during the oxidation or hydrolysis. In this preferred embodiment a reaction chamber temperature of about 900° C. is maintained. As a result of such treatment, the adhering titanium oxide reacts with the gaseous chlorine and reducing agent forming gaseous titanium tetrachloride and carbon dioxide, which leave the reaction chamber together with any unreacted chlorine and carbon monoxide. Care is taken to properly adjust the flow rates so as to promote and obtain a high degree of reaction and removal of relatively small amounts of unreacted chlorine and carbon monoxide. Passage of the gaseous mixture of chlorine and carbon monoxide through the reaction zone is continued until such time as it is determined, by analysis or otherwise, that the gases leaving the reaction chamber no longer contain carbon dioxide in substantial quantities. Such observation and determination indicates that $TiO_2$ scale removal from the interior surfaces of the reaction vessel is substantially complete and at this time the flow of chlorine and carbon monoxide to the reactor is discontinued and the flow of metallic halide and oxidizing gas into the reactor to produce titanium dioxide is again commenced. The gaseous products of reaction formed in removing the titanium oxide scale from the reaction vessel are conveyed to suitable condenser equipment where the metallic halide is separated and recovered from the remaining gases. The recovered halide is then recycled and used in the succeeding oxidation or hydrolysis step of the process.

To a clearer understanding of the invention, the following examples are given, which are merely illustrative of certain specific embodiments thereof and are not to be taken as in limitation of our invention:

*Example I*

Titanium tetrachloride was oxidized by air in a conventional type reactor maintained at 1005° C. After operating for some time, the reaction chamber became partially plugged through deposition of coarsely crystalline titanium dioxide which adhered tightly to the walls and extended well out into the center of the chamber. The flow of air and of titanium tetrachloride was thereupon discontinued and equal parts by volume of carbon monoxide and of chlorine were introduced at a rate which gave an average retention time of the gases in the heated reactor of about 3.2 seconds. During the addition of carbon monoxide and chlorine, the reaction chamber was maintained at 950° C. The resulting gaseous products of reaction were led from the reactor to a condenser where titanium tetrachloride collected. After 57 minutes, the collection of titanium tetrachloride in the condenser had practically ceased and at this point the flow of carbon monoxide and of chlorine through the reactor was discontinued and said reactor was cooled. On inspection it was found that as a result of such treatment the crystalline deposit of titanium dioxide in said reactor was completely removed from the center of the reaction chamber and that only a thin film of oxide remained adhering to the walls.

*Example II*

During the vapor phase oxidation of ferric chloride with oxygen at 900° C., ferric oxide scale formed in the reaction chamber. The flow of reactants was thereupon stopped and a stream of gas consisting of equal parts by volume of carbon monoxide and of chlorine was then introduced while the reaction chamber was maintained at 900° C. After thirty minutes of such treatment, the flow of carbon monoxide and chlorine gases was discontinued and the reaction chamber was examined to note the effect on removal of the oxide deposit.

With the reaction chamber maintained at 900° C., the flow of chlorine was resumed for 30 minutes, but without any carbon monoxide addition. Thereupon the chlorine flow was shut off and the reactor inspected.

In the same fashion, and for comparative purposes, tests were made with an equal volume mixture of carbon monoxide and of chlorine and with chlorine alone, while the reaction chamber was maintained at 700° C. In each case, the test was continued for thirty minutes and the rate of gas flow during these trials was sufficient to give a linear velocity of about 1.5 inches per second.

A comparison of the results obtained under the various conditions above described reveals that the ferric oxide scale was quite effectively removed by the mixture of carbon monoxide and chlorine at 900° C., while slower scale removal was effected at 700° C. or when chlorine was used alone. The approximate rate of scale removal in parts by weight of oxide per minute per square foot is shown in the following tabulation:

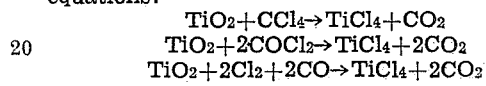

|  | 700° C. | 900° C. |
| --- | --- | --- |
| $CO+Cl_2$ | 3.1 | 16.3 |
| $Cl_2$ alone | less than 0.1 | 3.0 |

*Example III*

Zirconium tetrachloride was oxidized with air in a reaction chamber maintained at 1000° C., yielding finely-divided zirconium dioxide, most of which was carried out of the reactor in the product gas stream. After operating for some time, the reactor became partially plugged by deposits of the oxide adhering to its walls. The flow of zirconium tetrachloride and air was thereupon discontinued and the reactor was maintained at a temperature of about 1000° C. A gas mixture comprising equal parts by volume of chlorine and of carbon monoxide was then introduced into the reactor and allowed to pass through its reaction chamber for a period of thirty minutes. Gaseous zirconium tetrachloride, formed as a result of the reaction with the oxide scale, was condensed out of the gases issuing from the reactor by cooling to 30° C. At the end of said thirty-minute period, the gas mixture flow was shut off and the furnace cooled. It was found upon inspection that the wall deposit of zirconium dioxide had been completely removed as a result of such gaseous treatment.

While the invention has been described as applied to certain specific embodiments, it is not to be construed as limited thereto since due variance therefrom may be made without departing from its underlying spirit and scope. For example, while advantageously useful in removing titanium dioxide or iron oxide scale formed during vapor phase oxidation of gaseous mixtures of titanium tetrachloride and ferric chloride, it is also effectively useful for removing oxidic scale resulting from the vapor phase oxidation of other volatile metallic halides, especially the chlorides, of the metals aluminum, vanadium, chromium, tin, zirconium, zinc and tungsten, etc. The halides of these metals are oxidized at temperaures ranging from 300–1350 C. by reaction with gaseous oxidizing agents, such as air, steam, oxygen, oxygen-enriched air, ozone, or mixtures of oxygen with various inert gases other than nitrogen. The temperature at which easy oxidic scale removal is effected in accordance with the invention, using a particular gaseous reactant or mixture, depends upon the type of metallic oxide being removed but preferably is commensurate with that prevailing in the reaction chamber when the oxidation or hydrolysis reaction of the involved volatile metal halide takes place.

The gas or mixture of gases utilized in effecting oxidic scale removal under the invention is preferably of such type that it or they will combine a reducing and a halogenating function in the reaction and will result in reaction products which are gaseous at the prevailing temperature of reaction. While, as indicated, a mixture of carbon monoxide and gaseous chlorine, in approximately equal parts by volume comprises a preferred, most economical and effective type of reactant for use, other types of reactants or mixtures thereof, including phosgene, carbon tetrachloride, hexachloroethane, chloroform, can be used, as can mixtures of gaseous chlorine with sulfur or sulfur monochloride, or gaseous halogen (chlorine) suspensions containing a finely-divided, solid, carbonaceous (carbon, coke, charcoal, etc.) reducing agent. Similarly, the chlorination can be effected in the presence of a solid carbonaceous reducing agent suitably maintained within the reaction zone, or, if desired, in an atmosphere of a gaseous agent, such as carbon monoxide, maintained within said zone. Certain of the reactants mentioned, particularly phosgene, carbon tetrachloride, etc., combine in themselves the desired chlorinating and reducing function, and hence comprise highly useful reactants for adapting the invention. Typical reactions occurring in effecting scale removal under the invention are shown by the following equations:

$$TiO_2+CCl_4 \rightarrow TiCl_4+CO_2$$
$$TiO_2+2COCl_2 \rightarrow TiCl_4+2CO_2$$
$$TiO_2+2Cl_2+2CO \rightarrow TiCl_4+2CO_2$$

As will be evident, in all cases the reactant must be oxidizable and must yield chlorine regardless of whether it is made up of one or a mixture of two constituents.

When the preferred gas mixture, comprising equal volumes of chlorine and of carbon monoxide, is employed, the reaction taking place may be represented by the following equation, in which M stands for a metal:

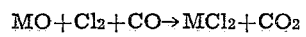

$$MO+Cl_2+CO \rightarrow MCl_2+CO_2$$

It is apparent from this equation that equimolar, and hence equal volume, parts of chlorine and of carbon monoxide take part in the reaction. For this reason it is generally preferred to use a mixture composed of essentially equal parts of the two gases, particularly since an excess of either component serves to dilute the product gases and hence to make more difficult the subsequent condensation of the recovered metal chloride. In some cases, however, there may be advantage in maintaining an excess of one or the other gas. The removal of ferric oxide scale, for example, is facilitated by the use of a slight excess of chlorine which acts to repress the dissociation of the ferric chloride produced into the less volatile ferrous chloride. For this reason the invention is not to be considered as limited to the use of stoichiometric proportions, although in most cases these comprise the preferred mixture.

It is possible by the practice of this invention to operate a vapor phase oxidation or hydrolysis unit without having to periodically cool the reaction chamber in order to remove scale deposits. This may be done by introducing the scale removing gas or gases when the reaction chamber becomes almost completely plugged with oxide deposit, or it may be found preferable to employ a regular schedule of periodic scale removal to prevent the oxide deposits from ever occupying a sizable portion of the reactor volume.

It is usually desirable to preheat the scale removing gas or gas mixture before introducing it into the reaction chamber to obtain the greatest efficiency in its action. However, if other means are available for maintaining the reaction chamber at the required temperature, this will be unnecessary.

The present invention provides a valuable and important improvement in vapor phase oxidation or hydrolysis processes. When such reactions are carried on without practicing this invention, it is necessary either to operate under conditions which give no oxide deposits on the reaction chamber walls or vapor inlets, or to periodically shut down the unit and mechanically remove the scale. Obviously, either alternative is difficult and undesirable—the former generally leading to poor conversions of the metallic halide to oxide or providing an undesirable physical form of oxide product. The latter alternative requires cooling of the reactor and it is often found that mechanical removal of scale is difficult and gives rise to pitting and occasional failure of the reactor walls.

By practicing this invention, it is possible to use optimum reaction conditions without encountering formation of objectionable adherent deposits and to operate the oxidation process over long periods of time without shut-downs or the necessity of cooling the reactor. The useful life of the reactor walls is thus prolonged and appreciable savings in labor and maintenance are consequently effected.

We claim as our invention:

1. A method for removing titanium oxide scale adhering to the internal surfaces of a reaction zone on which said oxide becomes deposited during the vapor phase reaction of a titanium halide with an oxidizing gas, which comprises, following the discontinuance of the introduction of said metal halide and oxidizing gas reactants into said zone, subjecting said adhering oxide to reaction within said zone at an elevated temperature from 800–1350° C. with a gaseous chlorinating agent, effecting said reaction in the presence of carbon, and removing from said zone the resulting gaseous products of reaction.

2. A method for removing titanium oxide scale adhering to the internal surfaces of a reaction zone and formed therein during the vapor phase oxidation of titanium tetachloride, which comprises, following discontinuance of the introduction of the vapor phase oxidation reactants, subjecting said oxide to reaction at temperatures ranging from 800–1350° C. with a mixture of gaseous chlorine and carbon monoxide, and removing the resulting gaseous titanium tetrachloride and carbon dioxide reaction products as formed from said reaction zone.

3. A method for removing $TiO_2$ scale adhering to the internal walls of a reaction vessel and formed therein during the vapor phase oxidation of titanium tetrachloride which comprises periodically interrupting the vapor phase oxidation reaction and during said interruption subjecting the adhering oxidic scale to reaction at elevated temperature of from 900–1200° C. with a mixture of gaseous chlorine and carbon monoxide, and continuously removing from said reaction vessel the resulting gaseous products of reaction.

4. A method for removing titanium oxide scale adhering to the interior walls of a reaction vessel and deposited thereon during the vapor phase oxidation at an elevated temperature of titanium tetrachloride which comprises interrupting said vapor phase oxidation reaction and subjecting said oxide to reaction at an elevated temperature of from 900–1200° C. with a mixture of gaseous chlorine and carbon monoxide, and removing from said vessel as formed the resulting gaseous reaction products.

5. A method for removing titanium oxide scale adhering to the internal surfaces of a reaction zone and deposited thereon during the vapor phase oxidation of titanium tetrachloride with an oxidizing gas which comprises discontinuing the introduction into said zone of said vapor phase oxidation reactants and then subjecting said oxide scale to reaction at temperatures ranging from 900–1200° C. with a gaseous mixture consisting of equal parts by volume of carbon monoxide and chlorine, and removing from said zone the resulting gaseous titanium tetrachloride and carbon dioxide reaction products.

6. A method for removing titanium oxide scale adhering to the internal surfaces of a reaction zone and deposited upon said surfaces during the vapor phase oxidation of titanium tetrachloride with an oxidizing gas which comprises subjecting said oxide scale to reaction at temperatures ranging from 900–1200° C. with a mixture consisting of equal parts by volume of gaseous chlorine and carbon monoxide, removing the gaseous titanium tetrachloride and carbon dioxide reaction products which form in said zone and continuing the introduction of said gaseous mixture into said zone until the gaseous products being discharged therefrom no longer contain carbon dioxide.

7. A method for removing metal oxide scale adhering to the interior walls of a reaction vessel and deposited on said walls during the vapor phase oxidation at an elevated temperature of a metal halide, comprising interrupting said vapor phase oxidation reaction and subjecting said adhering oxide scale to reaction at temperatures ranging from 800–1350° C. with a gaseous chlorinating agent and a carbon-containing reducing agent, and removing from said vessel as formed the resulting gaseous reaction products.

PHILIP BERKELEY KRAUS.
HOLGER HEINRICH SCHAUMANN.

REFERENCES CITED

The following references are of record in the file of this patent:

UNITED STATES PATENTS

| Number | Name | Date |
|---|---|---|
| 1,445,329 | Lenher | Feb. 13, 1923 |
| 1,943,875 | Nagelvoort | Jan. 16, 1934 |
| 2,184,884 | Muskat | Dec. 26, 1939 |
| 2,245,076 | Muskat | June 10, 1941 |
| 2,288,980 | Turin | July 7, 1942 |